United States Patent [19]

Berkowitz

[11] Patent Number: 5,522,068
[45] Date of Patent: *May 28, 1996

[54] STATISTIC-BASED REORGANIZATION OF B-TREES YIELDING AN APPROXIMATE OPTIMAL FILL ON SUBSTANTIALLY EVERY PAGE

[75] Inventor: Brian T. Berkowitz, Bellevue, Wash.

[73] Assignee: Microsoft Corporation, Redmond, Wash.

[*] Notice: The term of this patent shall not extend beyond the expiration date of Pat. No. 5,446,887.

[21] Appl. No.: 459,757

[22] Filed: Jun. 1, 1995

Related U.S. Application Data

[62] Division of Ser. No. 123,322, Sep. 17, 1993, Pat. No. 5,446,887.

[51] Int. Cl.$^6$ .................................................. G06F 17/30
[52] U.S. Cl. ........................ 395/600; 395/427; 364/974; 364/975; 364/282.1; 364/282.2; 364/DIG. 1; 364/DIG. 2
[58] Field of Search .................................. 395/600, 427

[56] References Cited

U.S. PATENT DOCUMENTS

| | | | |
|---|---|---|---|
| 5,058,002 | 10/1991 | Nakamura et al. | 395/600 |
| 5,089,952 | 2/1992 | Bozman | 395/725 |
| 5,204,958 | 3/1993 | Cheng et al. | 395/600 |
| 5,218,696 | 6/1993 | Baird et al. | 395/600 |
| 5,261,088 | 11/1993 | Baird et al. | 395/600 |
| 5,446,887 | 8/1995 | Berkowitz | 395/600 |

FOREIGN PATENT DOCUMENTS

| | | | |
|---|---|---|---|
| 0546567A2 | 6/1993 | European Pat. Off. | G06F 11/34 |
| 0547992 | 6/1993 | European Pat. Off. | G06F 15/419 |
| 58-001242 | 3/1983 | Japan | G06F 15/40 |

OTHER PUBLICATIONS

Douglas Comer, "The Ubiquitous B-Tree", ACM Computing Surveys, vol. 11, No. 2, Jun. 1979, pp. 121–137.
Cesarini et al., "Binary tree Paging", Information Systems, vol. 7, No. 4, 1982, pp. 337–344.
Spirn et al., "Memory Management for B-Trees", Performance Evaluation An International Journal, vol. 5, 1985, pp. 159–174.
Roy Duncan, "Design Goals of the New High Performance File System", Microsoft Systems Journal, vol. 4, No. 5, Sep. 1989, p. 13.
Jim Powell, "B-tree Filer v. 5.0", Computer Language, vol. 7, No. 1, p. 99.
Tim Parker, "Off the Shelf: B-tree Data File Managers", Unix Review, vol. 9, No. 3, Mar. 1991, pp. 55–57.
Johnson et al., "Free-At-Empty is Better Than Merge-At-Half", Dr. Doobs Journal, vol. 7, No. 1, pp. 44–46.
David Snellen, "Ingres Table Structure", DBMS, vol. s, No. 8, Jul. 1992, pp. 60–62.
Sullivan et al., "An Index Implementation Supporting Fast Recovery for the POSTGRES Storage System", Eighth International Conference on Data Engineering, 2–3, Feb., 1992, pp. 293–300.
"Collecting Bucket Index Statistical Data with Colocation Considered," IBM Technical Disclosure Bulletin, Armonk, N.Y., 36(5) May 1993, pp. 1–2.

(List continued on next page.)

Primary Examiner—Thomas G. Black
Assistant Examiner—Paul R. Lintz
Attorney, Agent, or Firm—Seed and Berry

[57] ABSTRACT

A B-tree optimizer mechanism is provided for optimizing a B-tree stored in a storage device of a computer system. The B-tree optimizer monitors the type and amount of activity occurring within the B-tree. Based upon the type and amount of activity, the B-tree optimizer determines whether the B-tree should be reorganized. When it is determined that the B-tree should be reorganized, the B-tree optimizer computes an optimal fill factor for the pages within the B-tree, and reorganizes the B-tree by filling each page with key values according to the optimal fill factor.

7 Claims, 7 Drawing Sheets

OTHER PUBLICATIONS

Haq, E. et al., "New Algorithms for Balancing Binary Search Trees," in IEEE Southeastcon, Knoxville, Tenn., Apr. 11–13, 1988, pp. 378–382.

Motzkin, D., "Database Performance Optimization," in AFIPS 1985 National Computer Conference Proceedings, Chicago, Ill., Jul. 15–18, 1985, pp. 555–560, FIGS. 2–5.

STATISTIC-BASED REORGANIZATION OF B-TREES YIELDING AN APPROXIMATE OPTIMAL FILL ON SUBSTANTIALLY EVERY PAGE

CROSS-REFERENCE TO RELATED APPLICATION

This application is a divisional of U.S. patent application Ser. No. 08/123,322, filed Sep. 17, 1993 and now U.S. Pat. No. 5,446,887.

TECHNICAL FIELD

This invention relates generally to a computer method and system for storing data, and more particularly, to a computer method and system for B-tree optimization.

BACKGROUND OF THE INVENTION

Conventional storage structures, such as the well known B-tree, are used to quickly locate specific units of data (such as data records in a database or files in a directory) stored on a secondary storage device. A B-tree provides a means of clustering pointers to units of data, so that the units can be quickly located.

FIG. 1 is a block diagram of a conventional B-tree 100 storing a database index. The B-tree 100 has a root node 101, internal nodes 102, 103, 104, and leaf nodes 105, 106, 107, 108, 109, 110, 111, 112, 113. The root node 101 is the node at the top of the tree 100, the leaf nodes 105, 106, 107, 108, 109, 110, 111, 112 and 113 are those at the bottom of the tree, and the internal nodes 102, 103 and 104 are all of the nodes in between the root node and the leaf nodes.

The root node 101 contains one or more key values and two or more pointers to internal nodes 102, 103 and 104. Each internal node 102, 103 and 104 contains one or more key values and two or more pointers to lower level internal nodes or leaf nodes 105, 106, 107, 108, 109, 110, 111, 112 and 113. Each leaf node 105, 106, 107, 108, 109, 110, 111, 112 and 113 contains key values and pointers to units of data indexed by the key values. For example, the Leaf node 107 contains a key value "40" and a pointer 118 to a data record 119 that corresponds to the key value "40".

Nodes are considered parent nodes to nodes to which they point in the next lower level, which are considered child nodes. Leaf nodes have no child nodes. For example, the internal node 102 is a child node to the root node 101, and a parent node to the leaf nodes 105, 106, 107.

In order to clarify how searching is performed in a B-tree, it is helpful to consider an example. Suppose the B-tree of FIG. 1 is an index to a database file and the key values in each node correspond to a key value field in a data record of the database file. To locate a data record having a key value of "40", a searching routine follows pointer 114 from the root node 101 to the internal node 102. Next, the searching routine follows pointer 117 from the internal node 102 to leaf node 107. The searching routine then searches through key values in leaf node 107 until the key value "40" is found. Finally, the searching routine follows pointer 118 from leaf node 107 to data record 119.

For a comprehensive discussion of B-trees and B-tree maintenance algorithms, see Cormen, introduction to Algorithms (The MIT Press 1991), pp. 381–399.

Because a B-tree is stored in secondary storage and data is typically transferred from secondary storage to main memory one page at a time, a common optimization is to have each node in the B-tree occupy an entire page. This way, only one secondary storage access is required to read all of the key values in a node.

When a node is allowed to occupy an entire page, key values and pointers are added to the node until the node and page are full, i.e., there is no space available in the page. To add a key value to a node that is full, the node is divided into two nodes (each node containing one half of the key values and pointers), an additional page is allocated to the B-tree, and one of the two nodes is stored on the new page. The other node is stored on the additional page. A key value and a pointer to the other node are added to the parent node of the node that was split. When the parent node becomes full, the parent node is also split using the same technique. Splitting can propagate all the way to the root node, creating a new level in the B-tree whenever the root is split. Attempting to add one key value to a node that is full will cause a page split, leaving the B-tree with two pages that are half empty.

Normal activity in a B-tree includes the addition and the deletion of key values. As explained briefly above, key value additions can cause additional pages to be added to the B-tree. The additional pages do not always contain the maximum number of key values possible, thus wasting valuable storage space. Additionally, key value deletions can leave pages with a less than optimal number of key values stored on them.

SUMMARY OF THE INVENTION

In accordance with the present invention, a method is executed in a computer system having a central processing unit for executing instructions and a storage device for snoring information. In accordance with this method of the present invention, code is provided for a B-tree optimizer. The B-tree optimizer monitors activity occurring within a B-tree. Activity includes the addition and deletion of key values from the B-tree. After monitoring the amount and type of activity occurring within the B-tree, the B-tree optimizer determines whether the B-tree should be reorganized. When it is determined that the B-tree should be reorganized, the B-tree optimizer computes an optimal fill factor for the pages of the B-tree. The optimal fill factor is a percentage that each page in the B-tree should be filled depending upon the amount and type of activity previously detected in the B-tree. After computing the optimal fill factor, the B-tree optimizer reorganizes the B-tree.

The B-tree optimizer uses several methods to determine whether the B-tree should be reorganized. One method includes determining that the B-tree should be reorganized when the B-tree comprises a minimum number of pages and a substantial amount of page additions and page deletions has occurred within the B-tree in a given period of time. Another method includes determining that the B-tree should be reorganized when an amount of time since the last reorganization is greater than a minimum amount of time and a substantial number of key value deletions has occurred. Yet another method includes computing an optimal fill factor for the B-tree, and then determining that the B-tree should be reorganized when the amount of time since the last reorganization is greater than a minimum amount of time and the actual fill factor is greater than a previously determined fill factor.

DETAILED DESCRIPTION OF THE INVENTION

A preferred embodiment of the present invention provides a B-tree optimizer mechanism for automatically reorganizing a B-tree in accordance with the amount and type of activity (such as the addition and deletion of key values and pages) occurring in the B-tree. Based upon the amount and type of activity in the B-tree over a certain period of time, the B-tree optimizer determines an optimal amount that the pages in the B-tree should be filled before a page split occurs, and then reorganizes the B-tree so that each page is filled the determined optimal amount. The amount each page is filled is referred to as the fill factor of the B-tree.

Figure 1:
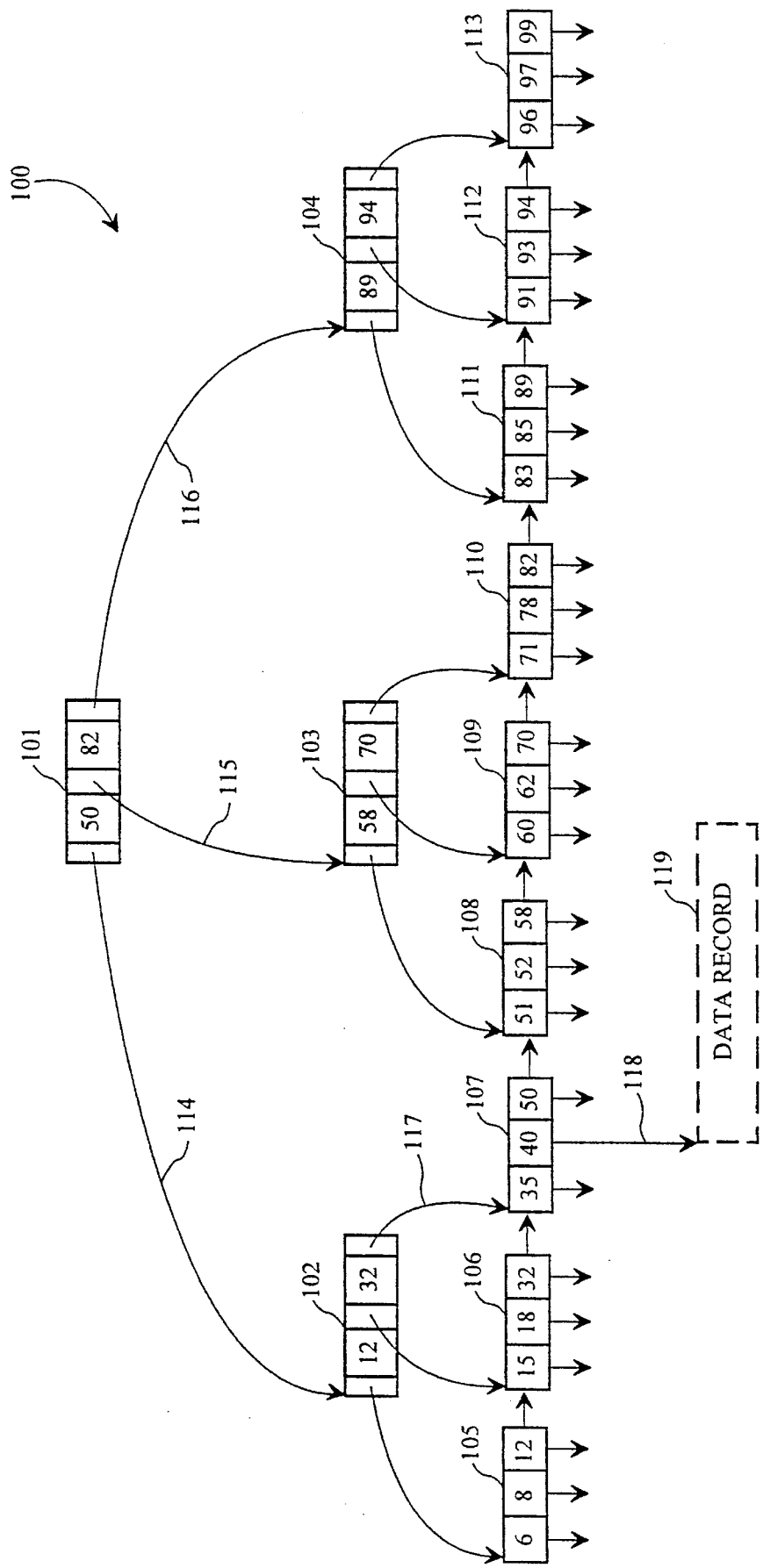
FIG. 1 is a block diagram of a convention B-tree.
Figure 2:
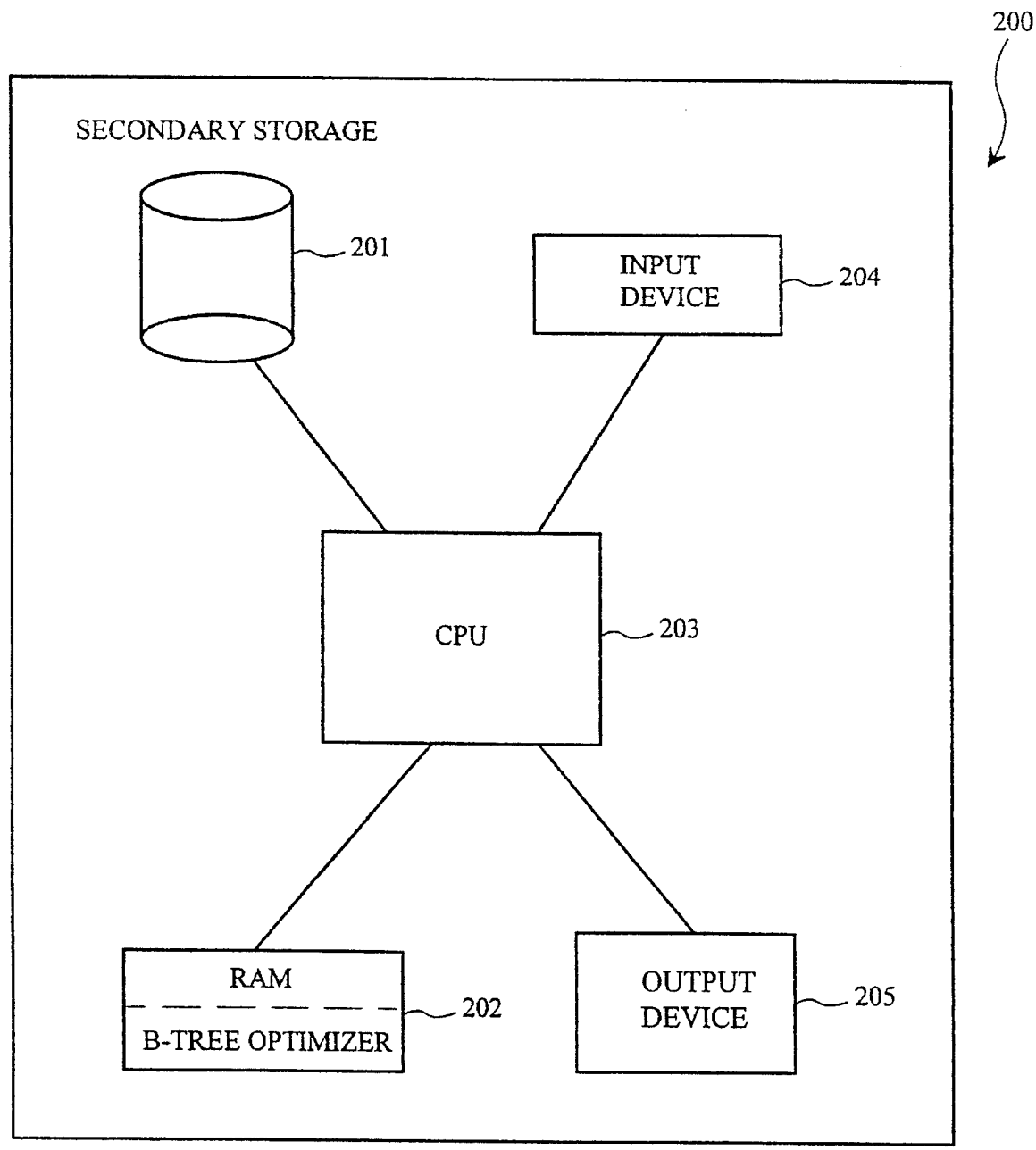
FIG. 2 is a block diagram of a preferred embodiment of a computer system for practicing a preferred embodiment of the preset invention.

FIG. 2 is a block diagram of a preferred embodiment of a computer system 200 for practicing the preferred embodiment of the present invention. This computer system 200 is merely illustrative and should not be viewed as restricting the present invention. Those skilled in the art will know other suitable computer system configurations for practicing the present invention. The computer system 200 comprises a secondary storage device 201, a random access memory (RAM) device 202, a central processing unit (CPU) 203, an input device 204, and an output device 205. When invoked, the B-tree optimizer provided by the present invention is loaded into the RAM device 202. The secondary storage device 201 is preferably some kind of disk system.

The amount of activity in B-tree in a certain period of time determines whether the B-tree is "static" or "dynamic." A static B-tree is one that does not have many key values added or deleted during the time period, while a dynamic B-tree is one that has many key values added or deleted during the time period. Because page splits do not occur very often in a static B-tree, an optimization is to have each page in the static B-tree contain as many key values as possible. By storing as many key values as possible on each page, the static B-tree will require a smaller amount of storage space. Conversely, because many key value additions and deletions occur in a dynamic B-tree, an optimization is to have each page in the dynamic B-tree contain just enough key values so that new key values may be added without the pages being split too often.

The B-tree optimizer provided by the preferred embodiment of the present invention takes into account whether a B-tree is static or dynamic when it computes an optimal fill factor. To determine whether a B-tree is static or dynamic, the B-tree optimizer must have access to activity statistics regarding the amount and type of activity occurring within the B-tree. In the preferred embodiment, B-tree maintenance algorithms provide activity statistics such as those listed below in Table A. These activity statistics are stored in a special block in the root node of the B-tree. When the B-tree optimizer is invoked, it is passed a pointer to the special block containing the activity statistics.

Table A

1. Number of pages in the B-tree.
2. Number of pages added since last reorganization.
3. Number of pages deleted since last reorganization.
4. Time of last reorganization.
5. Number of key values deleted since last reorganization.
6. Fill factor at time of last reorganization.

The activity statistics listed above in Table A may be obtained using counter variables. That is, every time a new page is added to the B-tree, a page counter is incremented. Those skilled in the art will appreciate than the activity statistics may be gathered using other methods.

In the preferred embodiment, the B-tree optimizer is invoked whenever a key value is added to or deleted from the B-tree. Those skilled in the art will recognize that other events may trigger the B-tree optimizer.

Figure 3:
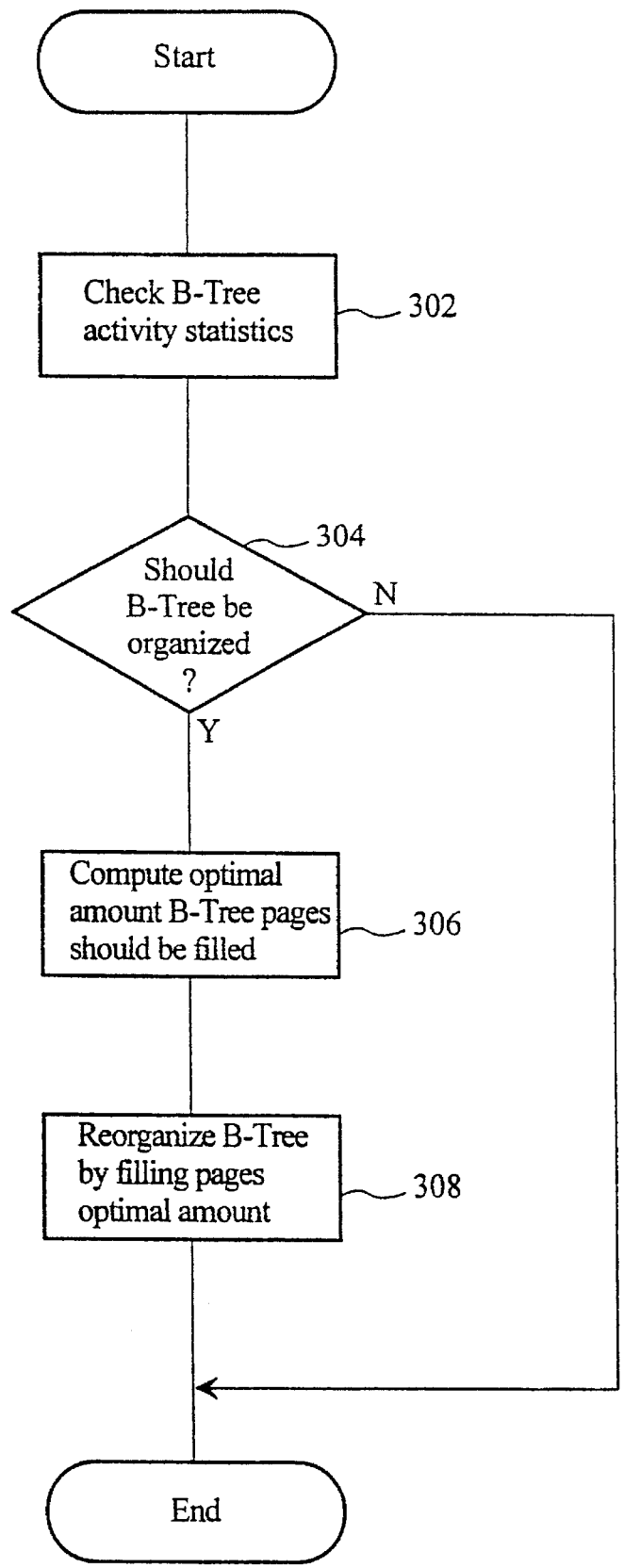
FIG. 3 is an overview flow diagram of a method used by the preferred embodiment to optimize a B-tree.
Figure 4A:
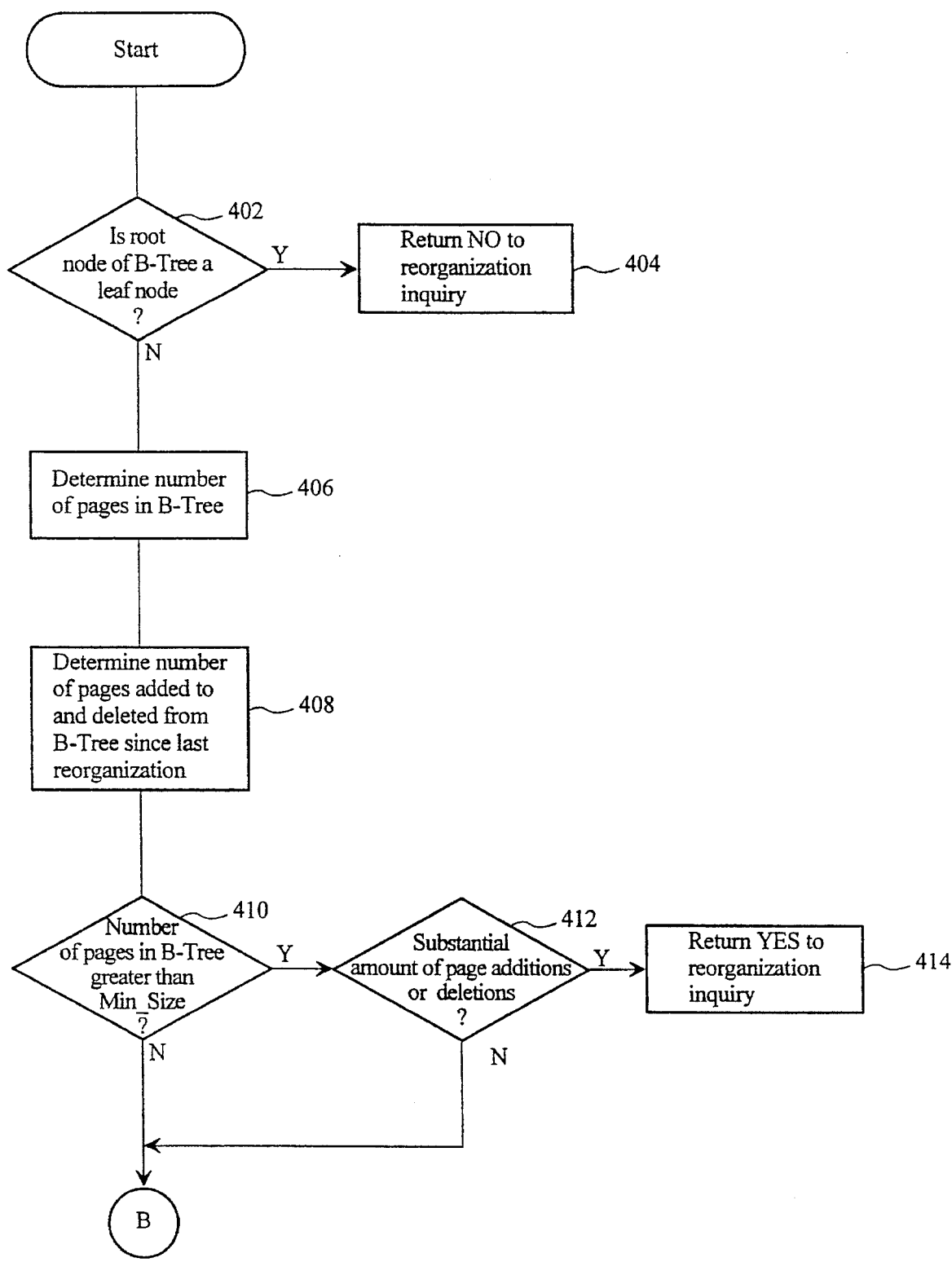
FIGS. 4A–4B comprise a detailed flow diagram of a method used by the preferred embodiment to determine whether a B-tree should be reorganized.

The B-tree optimizer optimizes a B-tree by performing the steps shown in the flow diagram of FIG. 3. In step 302, the B-tree optimizer checks the activity statistics for the B-tree. As mentioned previously, when the B-tree optimizer is invoked it is passed a pointer to the activity statistics stored in the root node of the B-tree. After checking the activity statistics for the B-tree, in step 304 the B-tree optimizer determines whether the B-tree should be reorganized. Those skilled in the art will appreciate that many different methods can be used to determine whether the B-tree should be reorganized. The methods used in the preferred embodiment to determine whether the B-tree should be reorganized are described in more detail below with reference to the flow diagram of FIGS. 4A–4B. If the B-tree optimizer determines that the B-tree should not be reorganized, then the process ends until the B-tree optimizer is again invoked.

Figure 5:
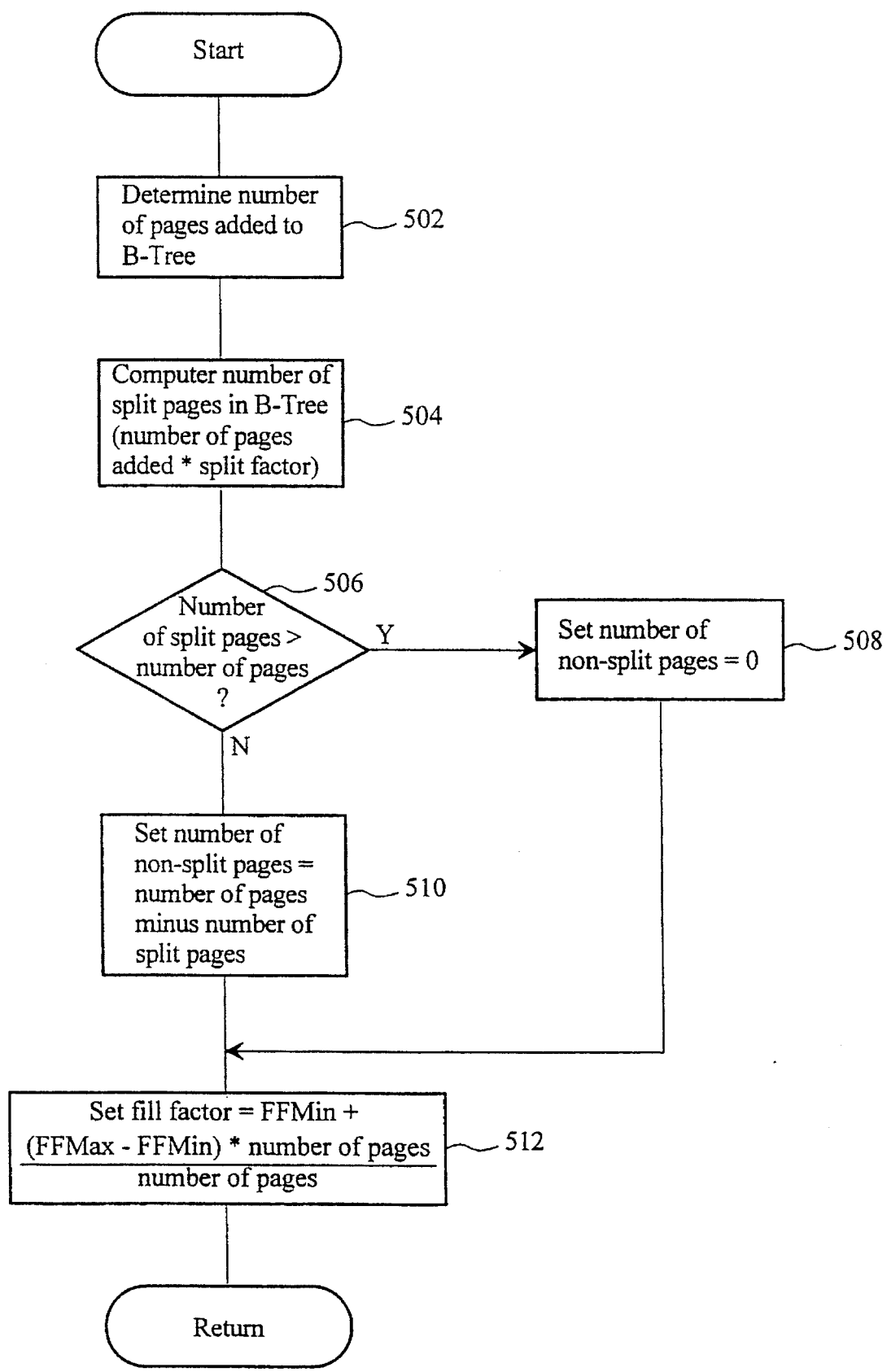
FIG. 5 is a detailed flow diagram of a method used by the preferred embodiment to determine an optimal fill factor for a B-tree.
Figure 6:
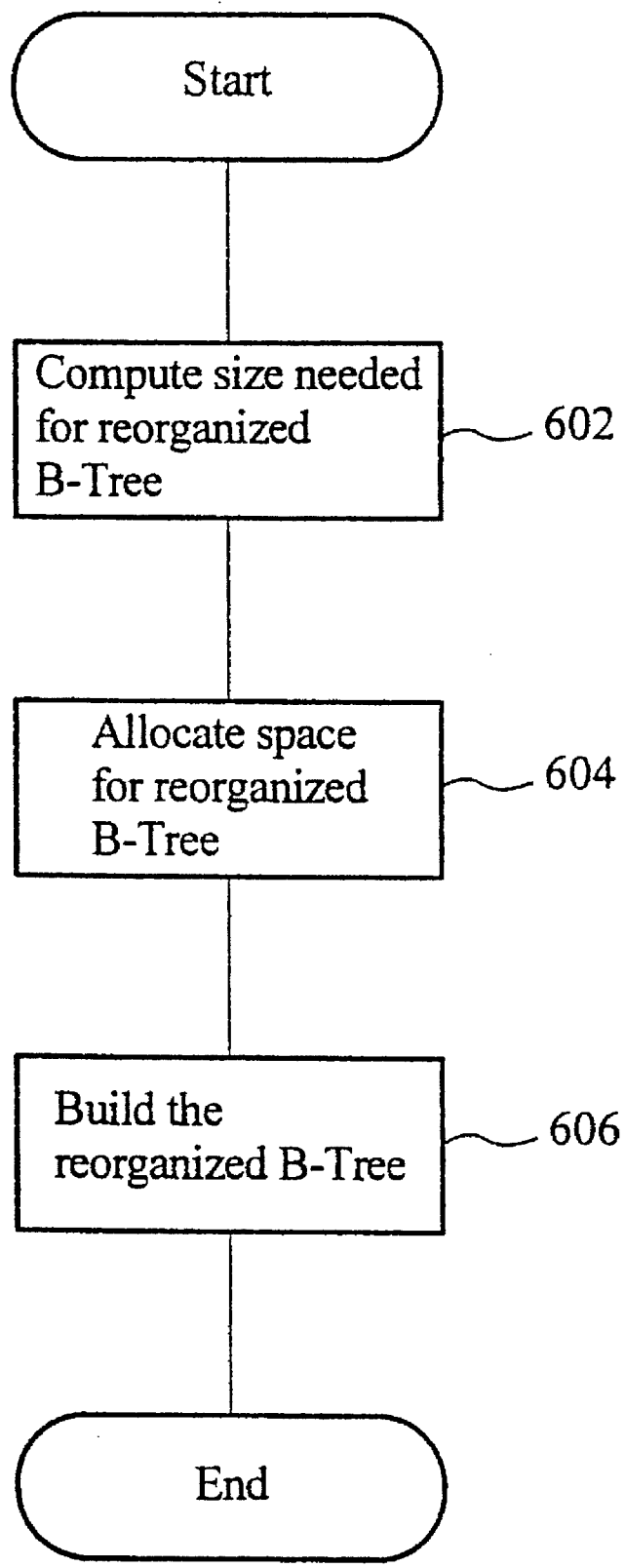
FIG. 6 is a detailed flow diagram of a method used by the preferred embodiment to reorganize a B-tree in accordance with an optimal fill factor.

If the B-tree optimizer determines that the B-tree should be reorganized (step 304), then in step 306 the B-tree optimizer computes the optimal amount that the pages in the B-tree should be filled based upon the amount and type of activity occurring within the tree. This amount is expressed in terms of a percentage and is referred to as the fill factor. The method used in the preferred embodiment to compute the optimal fill factor is described in detail below with reference to the flow diagram of FIG. 5. After determining the optimal fill factor (step 306), in step 308 the B-tree optimizer reorganizes the B-tree in accordance with the computed optimal fill factor. The method used in the preferred embodiment to reorganize the B-tree is described below with reference to the flow diagram of FIG. 6.

It is helpful to review the steps performed by the B-tree optimizer to determine whether the B-tree should be reorganized. The flow diagram of FIGS. 4A and 4B lists the steps used in the preferred embodiment to determine whether a B-tree should be reorganized. The method begins with a trivial test to determine if the B-tree includes more than one page, and then continues on to more substantive tests that take into consideration whether the B-tree is static or dynamic.

Beginning with step 402, if the B-tree optimizer determines that the root node of the B-tree is also a leaf node (i.e., the B-tree includes only one page), then the B-tree optimizer determines that the B-tree does not need to be reorganized. This determination is made without consideration of activity occurring within the B-tree. The B-tree optimizer can quickly determine whether the root node is a leaf node because each node has a flag that is set to indicate whether or not the node is a leaf node. If the root node of the B-tree is not a leaf node, then the B-tree optimizer proceeds with a series of tests to determine whether the B-tree should be reorganized.

The first test used in the preferred embodiment to determine whether the B-tree should be reorganized depends upon the number of pages in the B-tree and the amount of activity that has occurred in the tree since the last reorganization. In step 406, the B-tree optimizer determines the total number of pages in the B-tree. This information may be obtained from the activity statistics stored in the root node of the B-tree.

In step 408 the B-tree optimizer determines the number of pages added to and deleted from the B-tree since the last reorganization occurred. This information is preferably obtained from the activity statistics stored in the root node of the B-tree. The time period used when measuring the number of pages added or deleted can be a period of time other than since the last reorganization.

In step 410, the B-tree optimizer determines whether the total number of pages in the B-tree is greater than a minimum threshold. Although this minimum threshold is a constant that can have any value, in a preferred embodiment of the present invention, the minimum threshold is 5 pages. This value is chosen so than the performance on small B-trees is not impacted by the B-tree optimizer. If the total number of pages is greater than the minimum threshold, then in step 412 the B-tree optimizer determines whether a substantial number of page additions or deletions has occurred since the last reorganization.

In the preferred embodiment, a substantial number of page additions or deletions has occurred if the total number of pages is less than a page deletion factor times the number of page deletions plus a page addition factor times the number of page additions. The page deletion and addition factors reflect significant changes to the structure of the B-tree. In the preferred embodiment, the page deletion factor is chosen to be "2" and the page addition factor is chosen to be "1". These factors reflect that page deletions are considered to be more significant than page additions, because page deletions indicate the B-tree is becoming empty. If the total number of pages in the B-tree is greater than the minimum threshold (step 410) and a substantial amount of page additions or deletions has occurred (step 412), then in step 414 the B-tree optimizer determines that the B-tree needs to be reorganized.

If either the total number of pages in the B-tree is less than the minimum threshold (step 410) or a substantial amount of page additions or deletions has not occurred (step 412), then the B-tree optimizer conducts a second test to determine whether the B-tree should be reorganized. The second test used in the preferred embodiment depends upon the number of key values that have been deleted from the B-tree since the last reorganization and an amount of time that has passed since the last reorganization.

Figure 4B:
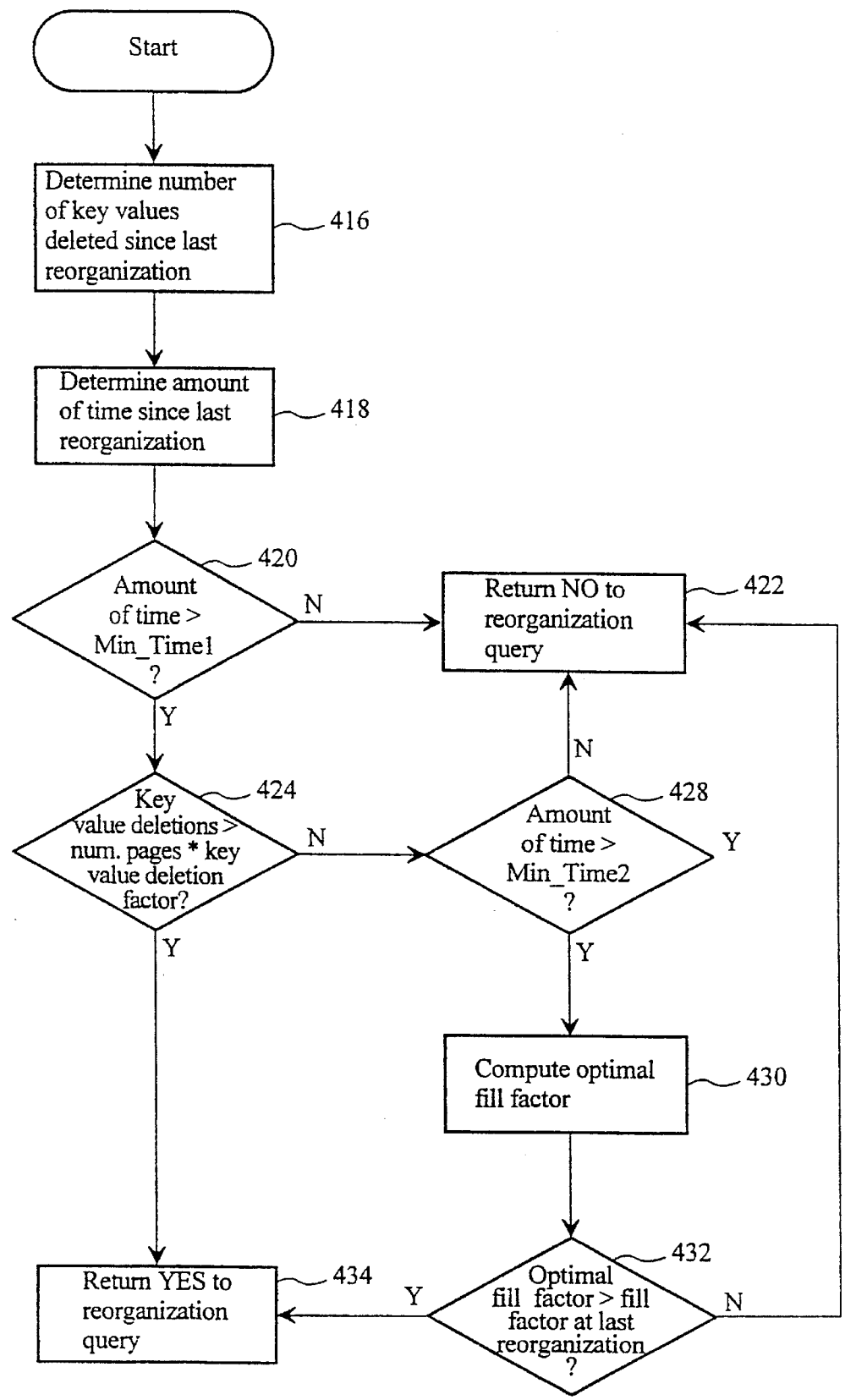

Referring now to FIG. 4B, in step 416 the B-tree optimizer determines the number of key values that have been deleted from the B-tree since the last reorganization. This information is preferably obtained from the activity statistics stored in the root node of the B-tree. The B-tree optimizer then determines the average number of key values that have been deleted from each page (number of key value deletions divided by number of pages). In step 418 the B-tree optimizer determines an amount of time that has passed since the last reorganization. The time of the last reorganization is preferably stored with other activity statistics in the root node of the B-tree. In step 420, the B-tree optimizer determines whether the amount of time since the last reorganization is greater than a minimum amount of time. This minimum amount of time can vary greatly, depending upon administration input. If a user of the computer system will be affected by pauses as a result of a reorganization, then the minimum amount of time should be a large number of days. If the amount of time that has passed since the last reorganization is not greater than a minimum amount of time, then the B-tree optimizer determines that the B-tree does not need to be reorganized (step 422).

If the minimum amount of time since the last reorganization has passed (step 420), then the B-tree optimizer determines in step 424 whether the average number of key values per page that have been deleted since the last reorganization is greater than a key value deletion threshold. In the preferred embodiment, the key value deletion threshold is chosen to be "5" to represent about 10%–15% of the total page size. If the average number of key values that have been deleted per page since the last reorganization is greater than the key value deletion threshold (i.e., more than 10%–15% of the page is free space), then the B-tree optimizer determines that the B-tree needs to be reorganized (step 426).

If the average number of key values that have been deleted per page since the last reorganization is less than the key value deletion threshold, then the B-tree optimizer conducts a third test to determine whether the B-tree should be reorganized. The third test used in the preferred embodiment depends upon the difference between the fill factor at the time of last reorganization and the optimal fill factor, and the amount of time that has passed since the last reorganization. In step 428 the B-tree optimizer determines whether the amount of time that has passed since the last reorganization is greater than a minimum amount of time. In the preferred embodiment, this minimum amount of time ms chosen to be a fairly high number (approximately 14–30 days) because the fill factor changes only after activity in the B-tree changes. For example, there may be a fair amount of activity in a B-tree after it is first created, and less later. A 14–30 day time period might reflect such shifts. If the amount of time since the last reorganization is less than the minimum amount of time, then the B-tree optimizer determines that the B-tree does not need to be reorganized (step 430). If the amount of time since the last reorganization is greater than the minimum amount of time, then in step 432 the B-tree optimizer computes the optimal amount the B-tree pages should be filled (i.e., the optimal fill factor). In step 434 the B-tree optimizer determines whether the optimal fill factor is greater than the fill factor at the time of the last reorganization. If it is not, then in step 430 the B-tree optimizer determines that the B-tree should not be reorganized. Otherwise, the B-tree optimizer determines that the B-tree needs to be reorganized (step 436).

After the B-tree optimizer determines that the B-tree needs to be reorganized (step 306 in FIG. 3), the B-tree optimizer computes an optimal fill factor for pages of the B-tree (step 308 in FIG. 3). In a preferred embodiment, the optimal fill factor varies from a minimum fill factor to a maximum fill factor using a linear scale based upon a percentage of pages that were split since the last reorganization. Although many different methods may be used to determine the optimal fill factor, the method used in the preferred embodiment of the present invention is described below with reference to the flow diagram of FIG. 5.

Beginning with step 502 (FIG. 5), the B-tree optimizer determines the total number of pages that have been added to the B-tree since the last reorganization. This information is preferably obtained from the activity statistics stored in the root node of the B-tree. Next, in step 504 the B-tree computes the number of page splits that have occurred since the last reorganization. This number is computed by multiplying the total number of pages in the B-tree by a split factor. In a preferred embodiment, the split factor is chosen to be "2" because for every page added as a result of a split, two pages are half full. Therefore, if half of the pages in the B-tree are split, each page will be half full.

The B-tree optimizer then determines in step 506 whether the number of page splits is greater than the total number of pages in the B-tree. If so, then in step 508 the B-tree optimizer sets a variable representing the number of non-split pages to zero. If the number of page splits is less than the total number of pages in the B-tree (step 506) then in step 510 the B-tree optimizer sets the variable representing the number of non-split pages equal to the total number of pages minus the number of page splits.

In step 512 the B-tree optimizer computes the optimal fill factor. In a preferred embodiment, the calculation used to compute the optimal fill factor (FF) is as follows:

$$FF = FFmin + \frac{(FFmax - FFmin) * \text{number of non-split pages}}{\text{total number of pages}}$$

The value for the minimum fill factor (FFmin) should be chosen so that it represents the minimum fill factor desired when the B-tree is reorganized. In the worst cast, the B-tree optimizer will generate a fill factor of 50%. A fill factor should be chosen than is above 50%, but not too high so as to overfill a dynamic B-tree. In a preferred embodiment, the minimum fill factor is chosen to be a value between 55%–65%. The value for the maximum fill factor (FFmax) should be slightly less than 100% because it is desirable to leave a small amount of space on each page so that a split does not occur immediately after the next key value is added to the B-tree. In a preferred embodiment, the maximum fill factor is chosen to be between 80%–90%.

After computing the optimal fill factor for the B-tree (step 308 of FIG. 3), the B-tree optimizer reorganizes the B-tree. Reorganization of the B-tree involves creating a new B-tree and moving all of the key values and pointers contained within the pages of the old B-tree to the new B-tree. In the preferred embodiment, the B-tree optimizer carries out the steps shown in the flow diagram of FIG. 6 to reorganize the B-tree.

In step 602 the B-tree optimizer computes the amount of storage space needed for the new B-tree. The amount of space needed is computed by scanning the existing B-tree and totaling the sizes of each [key value, pointer] pair in the B-tree. Based upon the optimal fill factor previously computed (step 306 of FIG. 3) and the total size of all of the [key value, pointer] pairs in the B-tree, the B-tree optimizer computes the size needed for the new B-tree. In the preferred embodiment, the size of the new B-tree is computed up front to make sure the operation will succeed (i.e., there is enough space for the new tree) and also to make it more likely that the space allocated for the new B-tree will be contiguous on the secondary storage device.

After computing the size needed for the new B-tree, in step 604 the B-tree optimizer allocates enough space for the new B-tree. The B-tree optimizer then builds the new B-tree in step 606. The new B-tree is built by scanning the existing B-tree and adding [key value, pointer] pairs to the new B-tree. In the preferred embodiment, the B-tree optimizer maintains a stack of pages representing the different levels of the new B-tree (e.g., the current leaf page, the current first level non-leaf page, the current second level non-leaf page, . . . , the root page). As the B-tree optimizer fills each leaf page in the new B-tree, the B-tree optimizer writes the leaf page to the secondary storage device, and adds a [key value, pointer] pair to the first level non-leaf page. The B-tree optimizer uses a recursive algorithm so that when the non-leaf page fills up, the non-leaf page is written to the secondary storage device and the first key value on the non-leaf page is added to the parent page. In this way, the B-tree is built by writing each leaf and non-leaf page exactly one time. After all [key value, pointer] pairs are written to the new B-tree, the leaf and non-leaf pages that are only partially filled are written to the secondary storage device along with the root page. Those skilled in the art will appreciate that other methods may be used to create the new B-tree.

Although the methods and systems of the present invention have been described in terms of a preferred embodiment, it is not intended that the invention be limited to this embodiment. Modifications within the spirit of the invention will be apparent to those skilled in the art. The scope of the present invention is defined only by the claims that follow.

I claim:

1. A method in a computer system of automatically reorganizing a B-tree, the B-tree comprising a plurality of pages, and an amount of data being stored on each page, the method comprising:

providing activity statistics for the B-tree;

when data is added to or deleted from the B-tree, determining whether the B-tree should be reorganized by analyzing the activity statistics; and when it is determined that the B-tree should be reorganized, computing an optimal amount of data that should be stored on each paged of the B-tree, and reorganizing the B-tree by storing approximately the optimal amount of data on each page of the B-tree.

2. The method of claim 1 wherein the B-tree was previously reorganized and the activity statistics include an amount of time since the last reorganization and the step of determining whether the B-tree should be reorganized includes determining that the B-tree should not be reorganized when the amount of time since the last reorganization is less than a minimum amount of time.

3. A method in a computer system of automatically reorganizing a B-tree, the B-tree comprising a plurality of pages, and an amount of data being stored on each page, the method comprising:

providing activity statistics for the B-tree;

after a predetermined amount of time has passed, determining whether the B-tree should be reorganized by analyzing the activity statistics, and when it is determined that the B-tree should be reorganized, computing an optimal amount of data that should be stored on each page of the B-tree, and reorganizing the B-tree by storing approximately the optimal amount of data on substantially each page of the B-tree.

4. The method of claims 1 or 3 wherein the activity statistics include a total number of pages in the B-tree and the step of determining whether the B-tree should be reorganized includes determining that the B-tree should not be reorganized when the total number of pages is less than or equal to one page.

5. The method of claims 1 or 3 wherein the activity statistics include a total number of pages added to the B-tree and the step of determining whether the B-tree should be reorganized includes determining that the B-tree should be reorganized when the total number of pages in the B-tree is greater than a minimum number of pages and the total number of pages added to the B-tree is greater than a page addition threshold.

6. The method of claims 1 or 3 wherein the activity statistics include a total number of pages deleted from the B-tree and the step of determining whether the B-tree should be reorganized includes determining that the B-tree should be reorganized when the total number of pages in the B-tree is greater than a minimum number of pages and the total number of pages deleted from the B-tree is greater than a page deletion threshold.

7. In a computer system having a B-tree with a number of pages holding data, a method comprising the steps of:

provided activity statistics that provide a metric of an amount of activity performed on the B-tree;

determining whether the amount of activity performed on the B-tree as reflected by the activity statistics exceeds a threshold; and where the amount of activity performed on the B-tree exceeds the threshold, reorganizing the B-tree so that data is stored in the pages so that it is distributed among the pages of the B-tree differently than before the reorganization.

* * * * *